Nov. 14, 1967  J. R. TURK  3,353,068

CONTROL BOX ASSEMBLY

Filed Dec. 2, 1965

INVENTOR
JAMES R. TURK

BY Oberlin, Maky & Donnelly
ATTORNEYS

United States Patent Office 3,353,068
Patented Nov. 14, 1967

3,353,068
CONTROL BOX ASSEMBLY
James R. Turk, Solon, Ohio, assignor to Vincent K. Smith, Gates Mills, Ohio
Filed Dec. 2, 1965, Ser. No. 511,135
9 Claims. (Cl. 317—99)

ABSTRACT OF THE DISCLOSURE

A control box assembly including a self-contained expendable cartridge element having exposed plug-type connector elements and means for releasably mounting the cartridge element on a bracket thereby permitting quick removal and replacement of the cartridge element in the event of failure of one of the components thereof.

---

The present invention relates generally, as indicated, to a control box assembly, and, more particularly, to certain improvements in the construction of control box assemblies for starting and overload protection of electric motors such as may be used for driving submersible pumps and the like.

A control box for starting and overload protection of a submersible pump motor generally includes a starting capacitor, a voltage relay for cutting out the auxiliary or starting winding of the motor once the motor reaches a predetermined operating speed, and a current sensing overload which opens the electric circuit for the motor should the motor current become excessive as when the rotor is locked against rotation due to binding, sand, corrosion, or for other reasons. It is the usual practice in the submersible pump motor field to mount such control boxes above ground at a convenient location to permit easy access for maintenance and repairs. However, as now constructed, the manufacturing costs of the control boxes and quite high and besides that they are very difficult to service.

It is therefore a principal object of this invention to provide an improved control box assembly which is relatively inexpensive to manufacture and service.

Another object is to provide a control box assembly of the type indicated with a cartridge element containing the various control components which may readily be replaced with a new cartridge in the event of a component failure without the need of any special tools in a minimum amount of time.

Still another object is to provide such a control box assembly with a novel wall mounting bracket for supporting the cartridge element, and novel means for simply and easily attaching and removing the cartridge element from the bracket.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the several ways in which the principles of the invention may be employed.

Figure 1:
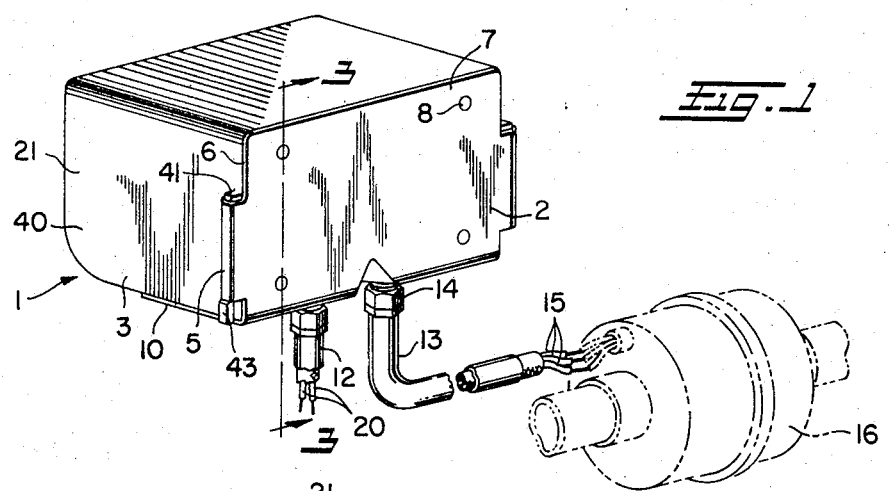
FIG. 1 is an isometric view of a preferred form of control box assembly in accordance with the present invention.

Turning now to the details of the drawing, and first of all to FIGS. 1 and 2, the preferred embodiment of control box assembly illustrated by way of example is generally indicated at 1 and comprises a mounting bracket 2 for supporting an expendable cartridge element 3 containing the various operating components of the assembly, as will be more fully discussed hereinbelow. As clearly shown in FIG. 2, the mounting bracket 2 is formed from a flat piece of sheet metal in the shape of an L with a pair of tab receiving channels 5 on the side edges 6 of the back portion 7. A plurality of mounting holes 8 may be provided in the back portion 7 through which suitable fasteners may be inserted for securing the mounting bracket 2 to a wall or the like (not shown) at any convenient location for servicing.

The base portion 10 of the mounting bracket 2 has a pair of laterally spaced openings 11 therein for attaching the ends of conduits 12 and 13 thereto by means of suitable connectors 14. Extending through one of the conduits 13 are the motor leads 15 from the electric motor 16 which may be located in a well or the like a considerable distance from the mounting bracket. The other conduit 12 contains the power lines 20 from a suitable power source.

Figure 4:
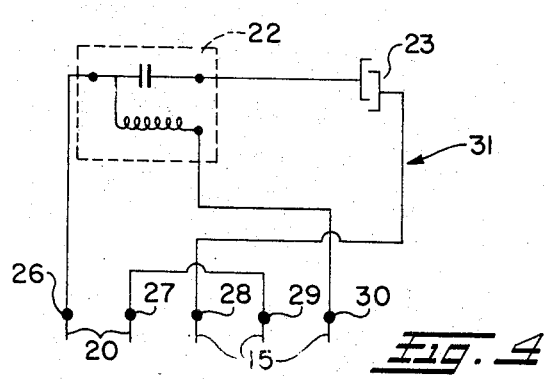
FIG. 4 is a schematic wiring diagram of the various control components of the assembly.

The cartridge element 3 includes a housing 21 preferably made from molded plastic such as polypropylene in which there is disposed a current-type starting relay 22 and a starting capacitor 23 which, when connected to the motor leads 15 and power lines 20 in the manner shown in FIG. 4, are operative to remove the starting winding (not shown) of the electric motor 16 from the motor circuit after the motor reaches a predetermined operating speed. If desired, an overload sensing device may also be contained within the cartridge element 3, but in this particular example it is preferred that such overload device be placed directly in the motor for sensing both current and temperature. Thus, in the event that the motor current or motor temperature becomes excessive as when the rotor is locked against rotation due to binding, sand, or corrosion, for example, the overload device will automatically open the power lines.

The components 22 and 23 may be potted directly in the cartridge housing 21 adjacent the rear wall 24 using a suitable resin 25 with the male plug-type connector elements 26, 27, 28, 29 and 30 for the starting relay and capacitor circuit 31 projecting from the potting material 25 within the interior of the cartridge housing 21.

A pair of self-tapping screws 33 or the like may be inserted through the rear wall 24 for anchoring the potting material 25 within the housing 21, and in addition, an inwardly projecting rib 34 may be formed on the inner surface of the housing 21 adjacent the forward wall 35 of the potting material to assist in retaining the potting material therewithin.

Figure 2:
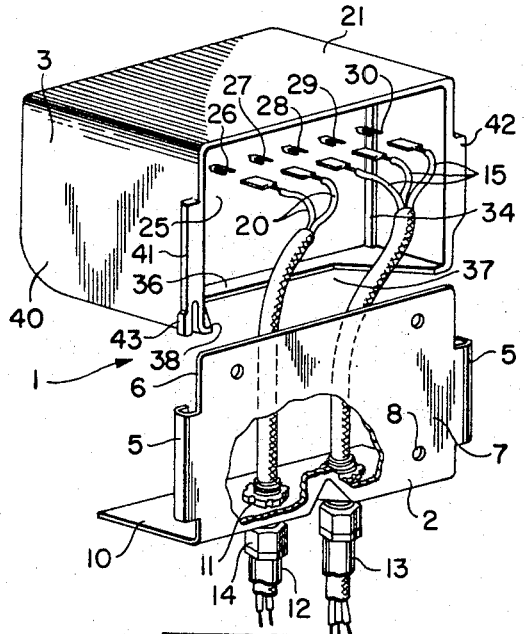
FIG. 2 is an exploded isometric view of the control box assembly of FIG. 1 with the parts thereof in disassembled form.
Figure 3:
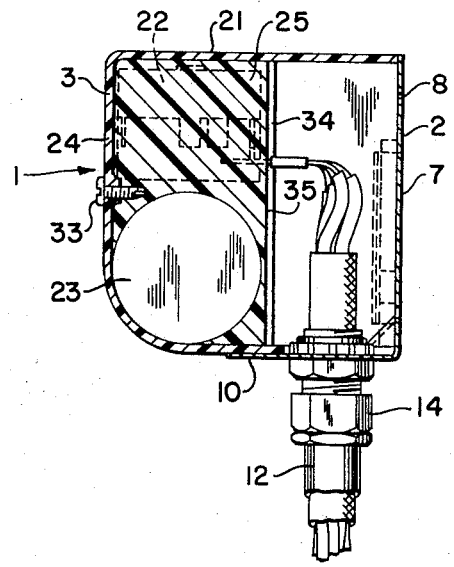
FIG. 3 is a partial vertical section taken on the plane of the line 3—3 of FIG. 1.

The bottom wall 36 of the housing 21 has a trapezoidal or similar shape opening 37 adjacent its forward end 38 to permit the cartridge element 3 to be positioned on the mounting bracket 2 as shown in FIG. 1 with the bottom wall 36 of the cartridge element engaging the base portion 10 of the mounting bracket, and the motor leads 15 and power lines 20 extending through the opening 37 into the interior of the cartridge housing 21 for connection to the appropriate quick-connect terminals 26–30.

For releasably securing the cartridge element 3 to the mounting bracket 2, the side walls 40 of the cartridge housing 21 are provided with narrow projections or tabs 41 and 42 adjacent their forward ends 38. These projections are adapted to be slidably received in the channels 5 on the back portion 7 of the mounting bracket 2, with one of the projections 41 having a flexible extension 43 at the lower end thereof for yieldably engaging the lower end of its associated channel 5 when the cartridge element 3 is properly positioned on such mounting bracket, as in FIG. 1.

From the above discussion, it can now be seen that it is a relatively simple matter to install the control box assembly 1 of the present invention wherever desired. The first step is the attaching of the mounting bracket 2 to a suitable support at a convenient location with the use of fasteners, after which the conduits 12 and 13 are secured to the base 10 of the bracket. Next the motor leads 15 and power lines 20 are inserted through the conduits 12, 13 and mounting bracket base portion 10 and attached to the respective terminals 26–30 on the control cartridge. Finally, the control cartridge 3 is slipped onto the mounting bracket 2 in the manner previously described, thus completing the assembly.

Because of its unique construction, the initial cost of the control box assembly 1 with cartridge element 3 of this invention is considerably lower than the usual type control box heretofore used. Moreover, should one of the components fail, the amount of time required for servicing is substantially less, it only being necessary to replace the relatively inexpensive cartridge element 3 with a new cartridge element and throw the old one away.

Other modes of applying the principles of the invention may be employed, change being made as regards the details described, provided the features stated in any of the following claims or the equivalent of such be employed.

I therefore, particularly point out and distinctly claim as my invention:

1. A control box assembly comprising, in combination, a self-contained expendable cartridge element and a mounting bracket for supporting said cartridge element, said cartridge element comprising a housing having electrical components embedded in plastic in said housing, said electrical components having a plurality of plug-type connector elements passing through and projecting from said plastic within the interior of said housing for providing a releasable connection to lead lines entering said housing through openings in said mounting bracket, and means for releasably securing said cartridge element to said mounting bracket, whereby said cartridge element may be quickly and easily replaced in the event of a failure of one of the components thereof.

2. The control box assembly of claim 1 wherein said mounting bracket is in the shape of an L including a back portion and a base portion, said base portion having a pair of laterally spaced openings therein through which said lead lines extend, said housing having a bottom wall supported by said base portion, said housing including said bottom wall extending beyond said plastic and said bottom wall having a cutout portion therein directly adjacent said openings in said base portion for passage of said lead lines into the interior of said housing.

3. The control box assembly of claim 2 wherein the end of said cartridge housing toward which said connector elements project is open for easy access into the interior of said housing for connecting and disconnecting said lead lines to the respective connector elements when said cartridge element and mounting bracket are disassembled.

4. The control box assembly of claim 2 wherein said back portion has side edges and said cartridge housing has side walls, and said means for releasably securing said cartridge element to said mounting bracket comprises a pair of channels extending along the side edges of said back portion, a pair of narrow projections extending along the side walls of said cartridge housing adjacent one end which are adapted to be received in said channels when said cartridge element is supported on said base portion as aforesaid, one of said projections having a flexible extension at the end closest to said base portion for yieldably engaging the adjacent end of its associated channel.

5. The control box assembly of claim 1 wherein said electrical components comprise a starting relay and a starting capacitor embedded in said plastic for connection to motor leads and lines from a suitable power source for starting and overload protection of an electric motor.

6. The control box assembly of claim 1 wherein said housing has inwardly projecting ribs engaged by said plastic for retaining said plastic within said housing.

7. In combination, a generally L-shape mounting bracket including a base portion and a back portion, an expandable cartridge element containing a plurality of components such as may be used for starting and overload protection of an electric motor supported by said base portion, and means for releasably securing said cartridge element to said mounting bracket, whereby said cartridge element may be quickly and easily replaced in the event of a failure of one of the components thereof, said last-mentioned means comprising a pair of channels extending along the side edges of said back portion, said cartridge element having side walls with narrow projections extending therefrom which are adapted to be received in said channels when said cartridge element is supported on said base portion as aforesaid, one of said projections having a flexible extension at the end closest to said base portion for yieldably engaging the adjacent end of its associated channel.

8. The combination of claim 7 wherein said cartridge element comprises a housing in which said components are embedded in plastic, and there are a plurality of plug-type connector elements projecting from said plastic within the interior of said housing for connecting said components to the motor leads and lines from a suitable power source.

9. The combination of claim 8 wherein said base portion has a pair of laterally spaced openings therein through which the motor leads and lines from the power source extend, said cartridge element having a bottom wall engaging said base portion with an opening in said bottom wall overlying said openings in said base portion for passage of said motor leads and lines into the interior of said housing, a pair of conduits surrounding said motor leads and lines, and connector means for attaching said conduits to said openings in said base portion, the end of said cartridge housing toward which said connector elements project being open for easy access into the interior of said housing for connecting and disconnecting said motor leads and power lines to the respective connector elements when said cartridge element and bracket are disassembled.

References Cited

UNITED STATES PATENTS

| | | | |
|---|---|---|---|
| 2,708,088 | 5/1955 | Steinke | 248—223 |
| 2,946,838 | 7/1960 | Bellek | 248—223 XR |
| 3,210,457 | 10/1965 | Hancock et al. | |

FOREIGN PATENTS 649,165    1/1951    Great Britain.

ROBERT K. SCHAEFER, *Primary Examiner.*

M. GINSBURG, *Assistant Examiner.*